United States Patent

Yamaguchi et al.

Patent Number: 5,191,566
Date of Patent: Mar. 2, 1993

[54] VELOCITY DETECTION METHOD AND APPARATUS THEREFOR

[75] Inventors: Hiroyuki Yamaguchi, Hirakata; Mitsuro Moriya, Neyagawa; Shinichi Yamada, Hirakata; Masayuki Shibano, Izumisano, all of Japan

[73] Assignee: Matsushita Electric Industrial Co., Ltd., Osaka, Japan

[21] Appl. No.: 486,845

[22] Filed: Mar. 1, 1990

[30] Foreign Application Priority Data

Mar. 7, 1989 [JP] Japan .................. 1-54054

[51] Int. Cl.⁵ .................. G11B 5/55; G11B 7/00
[52] U.S. Cl. .................. 369/32; 369/44.28; 369/54; 369/41; 369/44.11; 360/78.06
[58] Field of Search .......... 369/32, 44.28, 54, 58, 369/41, 44.11, 44.27, 44.29; 360/78.06, 78.07, 78.04

[56] References Cited

U.S. PATENT DOCUMENTS

| | | | |
|---|---|---|---|
| 4,106,058 | 8/1978 | Romeas et al. | 360/78 |
| 4,332,022 | 5/1982 | Ceshovsky et al. | 369/44 |
| 4,375,091 | 2/1983 | Dakin et al. | 369/32 |
| 4,719,610 | 1/1988 | Bates et al. | 369/44.28 |
| 4,740,939 | 4/1988 | Kimura et al. | 369/32 |
| 4,955,009 | 9/1990 | Nakatsu et al. | 369/32 |
| 4,955,011 | 9/1990 | Baba | 369/32 |
| 4,989,190 | 1/1991 | Kuroe et al. | 369/32 |

FOREIGN PATENT DOCUMENTS 599085 2/1984 Japan .

Primary Examiner—Tommy P. Chin
Assistant Examiner—Khoi Truong
Attorney, Agent, or Firm—Stevens, Davis, Miller & Mosher

[57] ABSTRACT

A velocity detection method and an apparatus therefor, in which the relative velocity between a light beam and tracks is detected on the basis of a period for which the light beam crosses the tracks, and under the condition that the light beam has passed by a predetermined position on the way to the target track, the detected relative velocity is compared with a predetermined velocity value so that when the detected relative velocity is larger than the predetermined velocity value the detected relative velocity is invalidated on the assumption that erroneous detection is generated by noise.

8 Claims, 7 Drawing Sheets

LEVEL ZERO

VELOCITY DETECTION METHOD AND APPARATUS THEREFOR

BACKGROUND OF THE INVENTION

1. Field of the Invention

The present invention relates to a velocity detection method for detecting a relative velocity between a recording medium having a plurality of tracks and a conversion means for recording/reproducing the recording medium, and to an apparatus effecting such method.

2. Description of the Prior Art

In an optical type recording and reproducing apparatus, a recording medium (hereinafter referred to as "disk"), obtained by forming a thin film of an optically recordable and reproducible material, through a process such as vacuum evaporation, on a surface of a substrate having uneven-structured concentric tracks, is irradiated with a light beam generated by a light source such as a semiconductor laser diode and focused by a condenser lens. In signal reproduction, a signal is read from reflection light from the disk under the condition that the light beam is made to have a relatively weak fixed light amount, while in signal recording, a signal is written on the disk under the condition that the light amount of the light beam is modulated to be weak and strong in accordance with the signal to be recorded.

Such an optical type recording and reproducing apparatus performs are focusing control for controlling the light beam so that the light beam is always substantially in a predetermined focusedcondition on the film of recording material and tracking control for controlling the light beam so that the light beam is always positioned on a track. Further, in order to enable the light beam to make random access or search on tracks on a disk, track search control is performed in which the light beam is moved toward a target track in the radial direction of disk while the tracking control is made inoperative, and the tracking control is made to operate again upon arrival of the light beam at the target track. As for the prior art with respect to track access or search operation, reference is made to U.S. Pat. Nos. 4,106,058 and 4,332,022.

One of the important matters for performing track access or search is the speed of displacement of the light beam when the light beam is caused to enter the target track, that is, the tracking pull-in speed.

The frequency bandwidth of tracking control is finite and the limit thereof is generally about several KHz. Accordingly, if the tracking pull-in speed is too high, a failure may be caused in pull-in of the tracking control into the target track. If the tracking pull-in speed is too low, on the contrary, the time required for the track search operation is prolonged.

When the light beam is displaced in the radial direction of the disk in the track search operation, accordingly, velocity control for controlling the velocity of the light beam is performed so as to control the tracking pull-in speed with accuracy to perform stable pull-in of the tracking control into the target track.

The track search operation is performed by displacing the light beam in the radial direction of the disk so that the velocity of movement of the light beam is in accord with a predetermined reference velocity corresponding to a current position of the light beam in the track search operation.

Figure 2A:
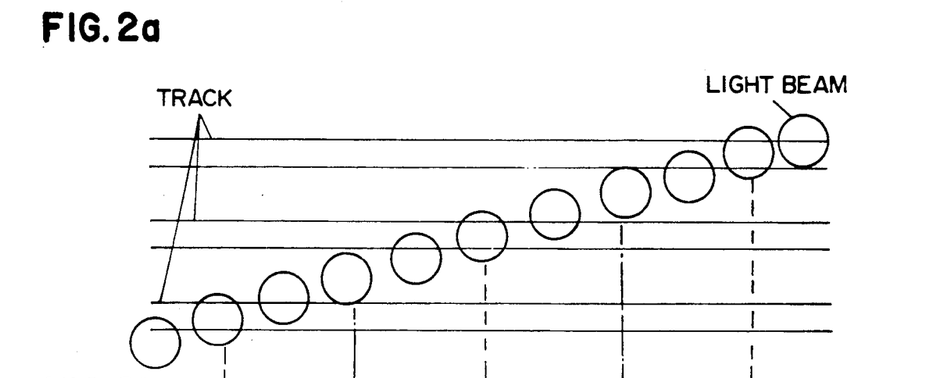
FIGS. 2(a)-(e) are used to explain the tracking error signal and the track accessing signal when the light beam runs across tracks.
Figure 2B:
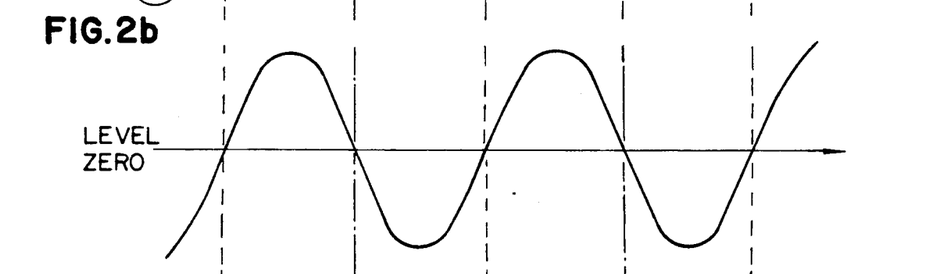
Figure 2C:
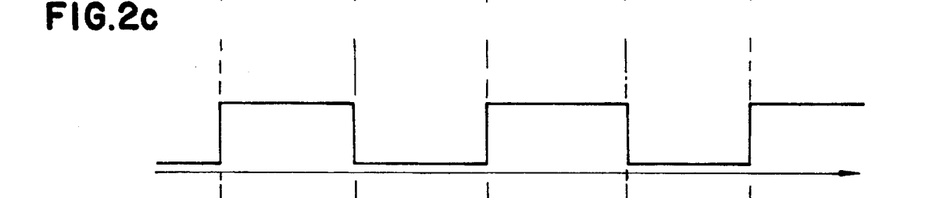

The current velocity of the light beam necessary for performing the velocity control is detected from the period of a track accessing signal which is caused when the light beam runs across tracks, as will be described later in detail. The current position of the light beam can be obtained by counting the track accessing signal caused at each of the tracks from the start track from which the track search operation is started. A tracking error signal and a track accessing signal are shown in FIG. 2. In FIG. 3, the diagram (a) shows the state in which the light beam runs across tracks on a disk and the diagram (b) shows a tracking error signal at that time.

JP-A-59-9085 (Feb. 29, 1984) and French Patent No. 7529707 (Sep. 29, 1975) teach in detail that the tracking error signal may be extracted by a push-pull method as shown in the diagrams (a) and (b) of FIG. 2 under the condition that the wave length of the light beam is λ and the optical depth of the unevenstructured tracks is about λ/8. Accordingly, explanation of how to extract the tracking error signal is omitted here.

In FIG. 2, the diagram (c) shows a waveform of a signal obtained by binary-digitizing the tracking error signal and the diagram (a) shows an edge detection signal obtained by detecting the leading edges of the waveform of the diagram (c). This edge detection signal is caused when the light beam runs across the center of each track as seen from the diagrams (a) and (d), and the edge detection signal is therefore a track accessing signal. Accordingly, the count value obtained by counting the edge detection signal, that is, the track accessing signal, from the start of the track search operation represents the current position of the light beam. Further, since the tracks are provided on a disk at substantially regular intervals P in the radial direction of the disk, the velocity V of the light beam is expressed by the following equation:

$$V = P/T$$

where T represents the period of the track accessing signal.

In FIG. 2, the diagram (e) shows a signal obtained by detecting the leading and trailing edges of the waveform of the diagram (c). If the period of the signal of the diagram (e) is represented by t, the velocity V of the light beam is expressed by the following equation:

$$V = P/2t.$$

However, fine dust or streaks may exist in a disk so that there occurs dropout due to such dust or streaks. Further, device noise may exist in the apparatus. If such dropout or device noise is mixed into a tracking error signal, noise in the form of pulses occurs in the binary-digitized signal so that the period of the track accessing signal becomes extremely short. Since the velocity of the light beam is detected on the basis of the period of the track accessing signal, the velocity of the light beam may be erroneously detected so as to be an extremely high speed. As a result, there has been a problem in that a command signal for reducing the velocity of the light beam may be erroneously issued so as to generate abnormal velocity fluctuations to thereby cause a failure in pull-in for the tracking control.

SUMMARY OF THE INVENTION

It is therefore an object of the present invention to provide a velocity detection method which is not affected by dropout of disk or device noise and an apparatus therefor.

In order to attain the above object, according to the present invention, processing is carried out so that on a recording medium having tracks on which information is to be recorded or on which information has been recorded, the relative velocity between a track and a conversion means for reproducing or recording a signal from or onto the recording medium is detected on the basis of the period for which the conversion means runs across the tracks and the detected relative velocity is compared with a predetermined velocity value so that the detected relative velocity is invalidated when the detected relative velocity is larger than the predetermined velocity value.

By the above processing, occurrence of erroneous velocity detection due to dropout of disk or device noise is detected by comparing the detected velocity with a predetermined value so as to invalidate the detected velocity at that time. Accordingly, abnormal sudden deceleration of the light beam can be prevented to thereby make it possible to perform a stable track search operation.

DESCRIPTION OF THE PREFERRED EMBODIMENTS

Figure 1:
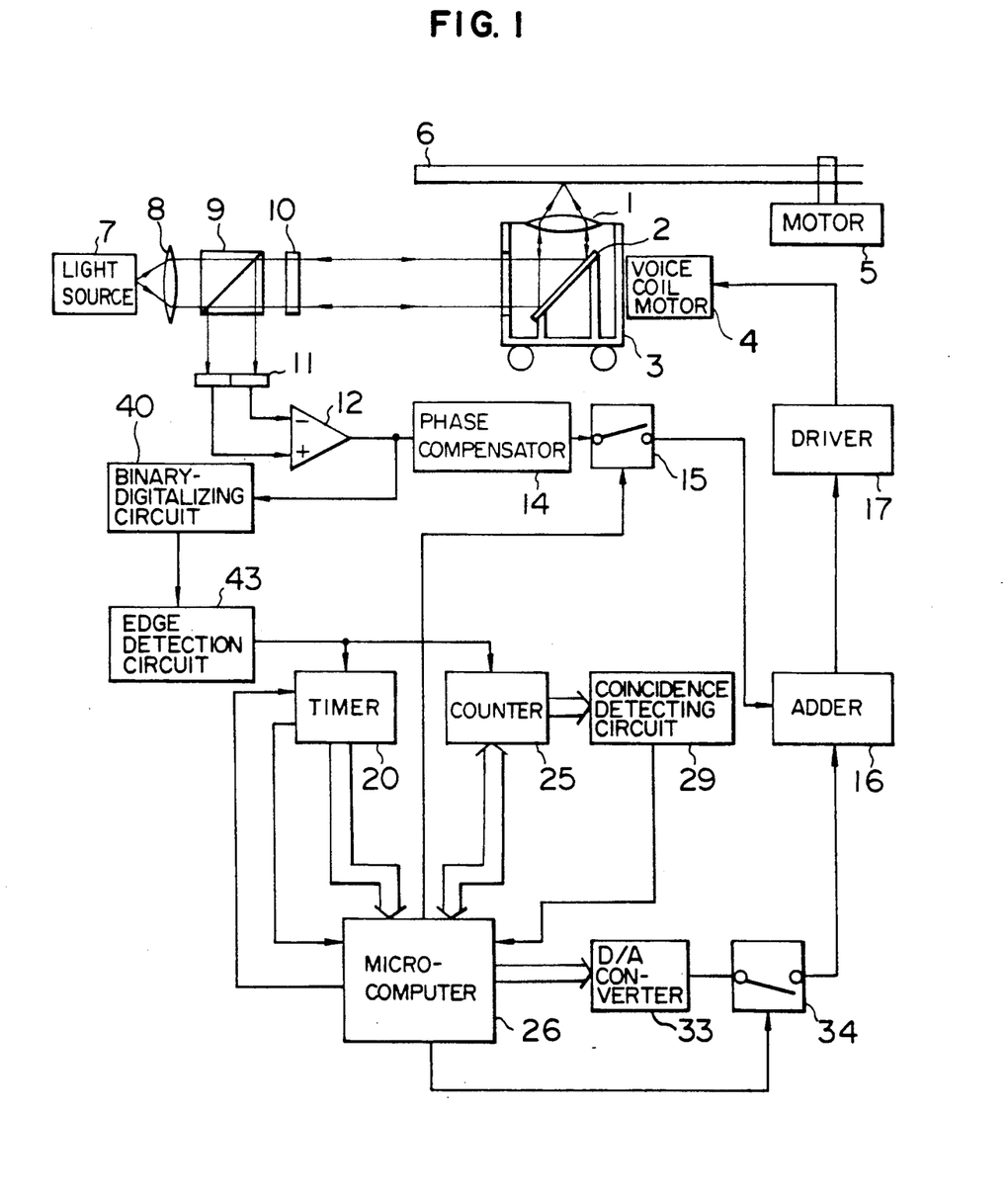
FIG. 1 is a block diagram showing an embodiment of the present invention.

FIG. 1 is a block diagram showing a track search apparatus in an embodiment according to the present invention. In FIG. 1, a condenser lens 1 and a reflecting mirror 2 are mounted on a transfer table 3 and are arranged to be driven by a voice coil motor 4 to move substantially in the radial direction of a disk 6 which is being rotated by a disk motor 5. A light beam emitted from a light source 7 such as a semiconductor laser diode or the like is made incident upon the reflecting mirror 2 mounted on the transfer table 3 through a collimator lens 8 for making the light beam to parallel light rays, a polarization beam splitter 9, and a ¼ wavelength plate 10. The light beam reflected from the reflecting mirror 2 is converged by the condenser lens 1 and made to be incident upon the disk 6. The light reflected from the disk 6 is passed through the condenser lens 1, reflected by the reflecting mirror 2, passed through the ¼ wavelength plate 10, reflected by the polarization beam splitter 9, and then made to be incident upon a divided photo detector 11. The dividing line of the divided photo detector 11 is arranged so as to be in accord with the longitudinal direction of a track on a light reception surface of the divided photo detector 11. An output signal of the divided photo detector 11 is applied to a differential amplifier 12. Tracks are formed on the disk with an uneven-structure having an optical depth of about $\lambda/8$ ($\lambda$ represents the wavelength of the light beam). Each track is provided with an address for track discrimination in the form of emboss-pits lined in the longitudinal direction of track. It is known, as described above, that the output signal of the thus configured differential amplifier 12 is the tracking error signal as shown in FIG. 2(b).

The output signal of the differential amplifier 12 is applied to the voice coil motor 4 through a phase compensation circuit 14, a switch 15, an adder 16, and a driving circuit 17 to thereby constitute a tracking control loop.

The phase compensation circuit 14 is provided for the purpose of securing the control stability in tracking control, and the switch 15 is provided for the purpose of switching the tracking control between operative and inoperative states.

The output signal of the differential amplifier 12 is applied also to a binary-digitizing circuit 40. The binary-digitizing circuit 40 binary-digitizes the output signal of the differential amplifier 12 and supplies the binary-digitized signal to an edge detection circuit 43. The edge detection circuit 43 is arranged to detect a leading edge of the output signal of the binary-digitizing circuit 40 to thereby produce a track accessing signal (the signal shown in FIG. 2(d).

The track accessing signal produced by the edge detection circuit 43 is applied to a timer 20. The timer 20 is arranged to measure the period of the output of the edge detection circuit 43 so that the measured value can be read out by a microcomputer 26. The timer 20 supplies a termination signal indicating the termination of the measurement of the period of the track accessing signal to the microcomputer 26, and the microcomputer 26 supplies a clear signal to the timer 20 so as to make the timer 20 clear its measured value and start its period measuring operation. A track accessing signal produced by the edge detection circuit 43 is applied also to a counter 25 which can preset a count value by microcomputer. The counter 25 counts the number of tracks across which the light beam runs so that the count value of the counter 25 can be read out by the microcomputer 26. The count value of the counter 25 is applied also to a coincidence detection circuit 29. The coincidence detection circuit 29 is constituted by a digital comparator so as to compare the count value of the counter 25 with zero (all 0) that the coincidence detection circuit 29 supplies a coincidence signal to the microcomputer 26.

Further, the microcomputer 26 is connected to a D/A converter 33 having an output connected to the adder 16 through a switch 34, so that the microcomputer 26 can drive the transfer table 3 to move in accordance with a desired signal by supplying a digital value to the D/A converter 33.

The microcomputer 26 supplies each of the switches 15 and 34 with a control signal for controlling the on-/off of the switches to thereby control the operation of the switches 15 and 34. Each of the coincidence signal produced by the coincidence detection circuit 29, the clear signal produced by the microcomputer 26, and the termination signal produced by the timer 20 is a binary signal and the high and low levels of the binary signal is represented by "H" and "L" respectively in the following description.

The track search operation will be described in the order of steps to thereby describe the operation of the respective parts in detail.

Before the track search operation is performed, the switch 15 has been turned on and the switch 34 has been turned off by the microcomputer 26, and the tracking control is in operation so as to make a light beam follow a predetermined track.

Figure 4:
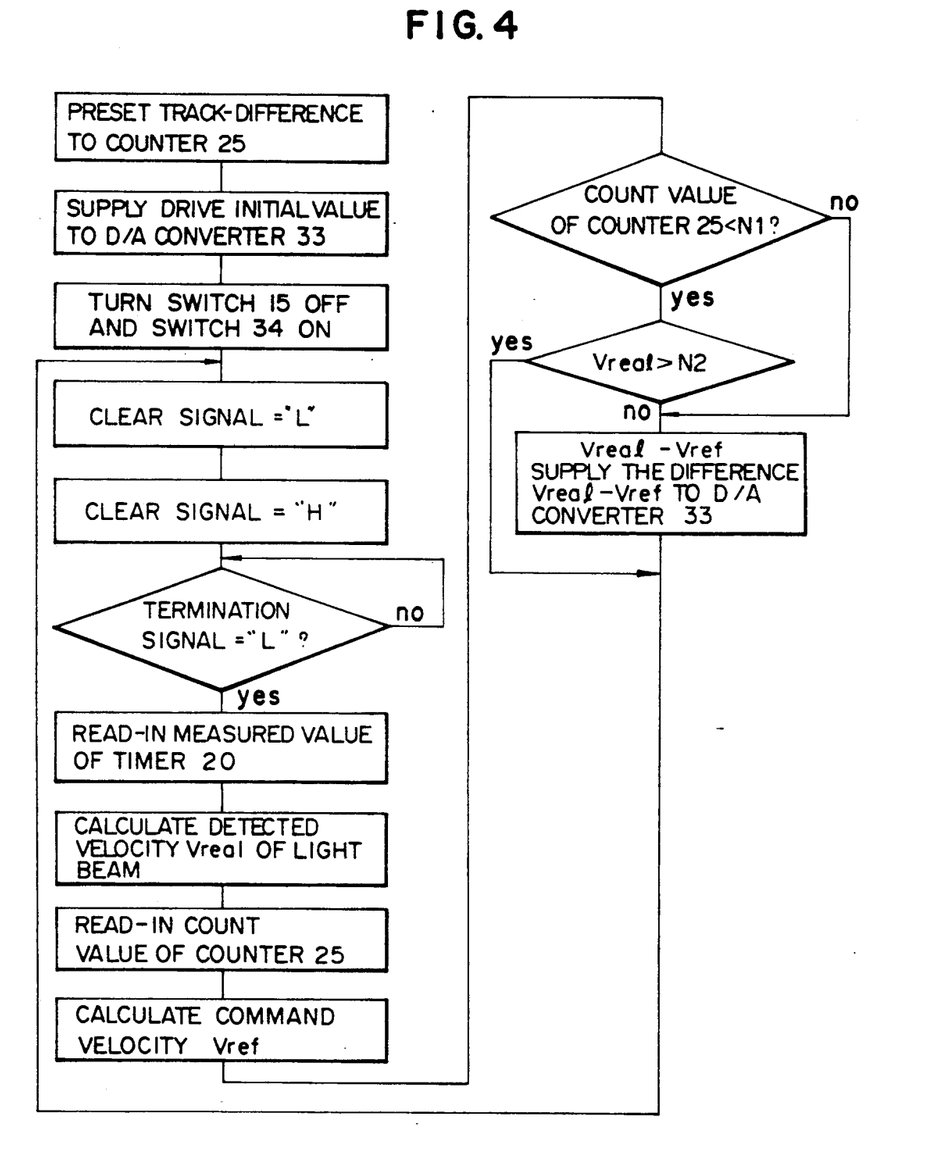
FIG. 4 is a flowchart of processing executed by the microcomputer 26 in the first embodiment.

Prior to the track search operation, the track difference between a track from which the track search operation is started and a target track is first preset by the microcomputer 26 to the counter 25, and a predetermined drive initial value for accelerating the light beam toward the target track is set to the D/A converter 33. Further, each of the coincidence signal produced by the coincidence detection circuit 29, the clear signal produced by the microcomputer 26, and the termination signal produced by the timer 20 has been set to "H". The switch 15 is turned off and the switch 34 is turned on in accordance with the command from the microcomputer 26, so that the tracking control is made inoperative, the light beam is started to move toward the target track, and the track search operation is started. Next, the microcomputer 26 sets the clear signal to "L" momentarily, and then sets the clear signal to "H" again. When the timer 20 detects a trailing edge of the clear signal produced by the microcomputer 26, the timer 20 clears its measured value and begins to measure the period of the track accessing signal produced by the edge detection circuit 43. Upon completion of the measurement of on period of the track accessing signal, the timer 20 sets the termination signal to "L" and holds the measured value until the clear signal produced by the microcomputer 26 becomes "L" again, and the period measurement is not performed by the timer 20. On the other hand, the counter 25 decreases its count value by one whenever the track accessing signal produced by the edge detection circuit 43 in the track search operation is applied to the counter 25. Accordingly, the count value of the counter 25 in the track search operation indicates the number of tracks which in turn represents the current position of the light beam on the basis of the target track, that is, the distance from the current position of the light beam to the target track. The embodiment is of type of a software servo system in which a part of a search control system is provided in the form of a program so as to be processed by the microcomputer 26. FIG. 4 is a flowchart showing some steps particularly relating to the present invention, of the processing to be performed by the microcomputer 26. Referring to the flowchart of FIG. 4, description will be made hereunder. The microcomputer 26 waits till the termination signal produced by the timer 20 becomes "L", and when the termination signal becomes "L", the microcomputer 26 immediately reads the measured value held in the timer 20 so as to calculate a detected or actual velocity $V_{real}$ of the light beam on the basis of the measured value in accordance with the following equation:

$$V_{real} = P/DT$$

where P represents the distance between two adjacent tracks and DT represents the measured value of the timer 20.

Thereafter, the microcomputer 26 reads the count value of the counter 25 and calculates a command velocity $V_{ref}$ on the basis of the count value. As shown in FIG. 3, the relation between the count value of the counter 25 and the command velocity $V_{ref}$ is established so that the larger the count value of the counter 25 becomes, the higher the command velocity $V_{ref}$ becomes. To prevent bad influence due to limitation in the dynamic range of velocity control, the command velocity $V_{ref}$ is made constant in the case where the count value of the counter 25 is larger than a predetermined value. The relation between the count value of the counter 25 and the command velocity $V_{ref}$ shown in FIG. 3 is stored in the form of a table in a memory of the microcomputer 26 so that the microcomputer 26 can immediately calculate the command velocity $V_{ref}$ corresponding to the count value of the counter 25. Next, the microcomputer 26 compares the count value of the counter 25 with a predetermined count value N1. In the case where the count value of the counter 25 is not smaller than the predetermined count value N1, the microcomputer 26 calculates the difference between the detected velocity $V_{real}$ of the light beam and the command velocity $V_{ref}$ and supplies the calculated value to the D/A converter 33. Thereafter, the microcomputer 26 sets the clear signal to "L" momentarily, then sets the clear signal to "H" again, and then returns to the processing for causing the timer 20 to measure the period of the track accessing signal produced by the edge detection circuit 43. The output of the D/A converter 33 drives the voice coil motor 4 through the switch 34, the adder 16, and the driving circuit 17. The polarity of the signal produced by the D/A converter 33 is set so that the light beam is accelerated by the voice coil motor 4 toward the target track when the command velocity $V_{ref}$ is higher than the detected velocity $V_{real}$ of the light beam, while it is set so that the light beam is decelerated when the command velocity $V_{ref}$ is lower than the detected velocity $V_{real}$. Accordingly, the light beam moves toward the target track at a velocity substantially equal to the command velocity $V_{ref}$ in the track search operation. Further, as the light beam moves toward the target track, the count value of the counter 25 decreases and the command velocity $V_{ref}$ becomes low correspondingly to the decrease of the count value, so that the velocity of movement of the light beam also decreases. On the other hand, when the count value of the counter 25 is smaller than the predetermined count value N1, the microcomputer 26 compares the detected velocity $V_{real}$ of the light beam with a predetermined velocity value N2. When the detected velocity $V_{real}$ of the light beam is higher than the predetermined velocity value N2, the microcomputer 26 sets the clear signal to "L" momentarily, then sets the clear signal to "H" again, and then returns to the processing for causing the timer 20 to measure the period of the track accessing signal produced by the edge detection circuit 43. Further, when the detected velocity $V_{real}$ of the light beam is not higher than the predetermined velocity value N2, the microcomputer 26 performs the same processing executed in the case where the count value of the counter 25 is not smaller than the predetermined count value N1.

Figure 5A:
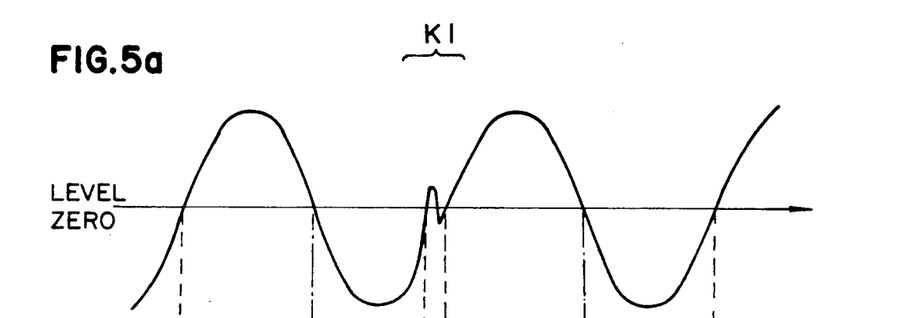
FIGS. 5(a)-(d) are used to explain the tracking error signal and the track accessing signal in the case of mixture of noise in the first embodiment.
Figure 5B:
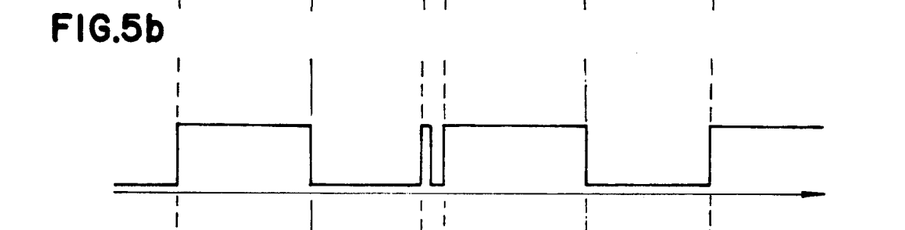
Figure 5C:
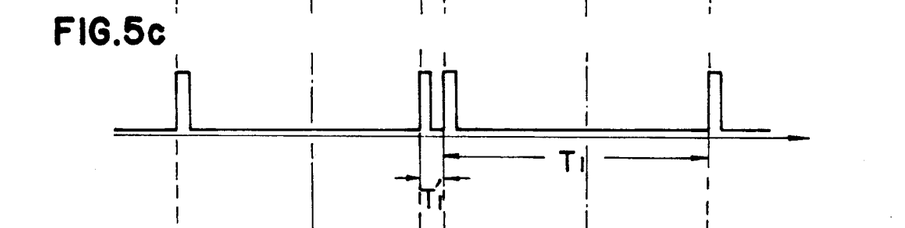
Figure 5D:
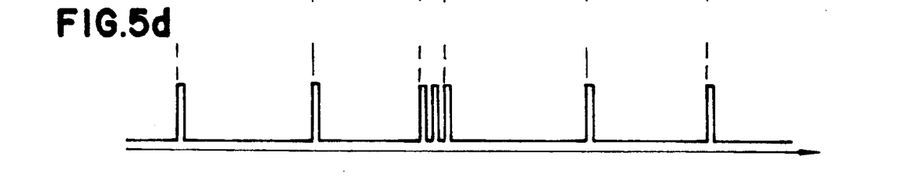

Referring to the flowchart of FIG. 4, the operation in the case where dropout of disk or device noise is mixed in the tracking error signal produced by the differential amplifier 12 will be described. FIGS. 5(a)-(d) show; signals when dropout of disk or device noise is mixed in the tracking error signal. FIGS. 5(a), 5(b) and 5(c);

show the tracking error signal produced by the differential amplifier 12, the binary-digitized signal produced by the binary-digitizing circuit 40, and the track accessing signal produced by the edge detection circuit 43 respectively. FIG. 5(d) shows a signal obtained by detecting leading and trailing edges of the signal shown FIG. 5(b). The variations of the tracking error signal in a time domain K1 in FIG. 5(a). are caused by the mixture of dropout of disk or device noise and do not correspond to the relation between the light beam and the track. Pulselike noise is caused, in the binary-digitized signal as shown in FIG. 5(b), because of the noise in the time domain K1. The period T1' of the pulse-like noise portion in time domain K1 in the FIG. 5(b) is extremely short in comparison with the period T1 in another normal portion. Assume now that the count value of the counter 25 satisfies the relation of the following expression:

$$DC < N1$$

where DC represents the count value of the counter 25, and N1 represents the predetermined count value. Further assume that the following relation is satisfied:

$$V1' > N2$$

where V1' represents the light-beam velocity corresponding to the period T1', and N2 represents the predetermined velocity value. At this time, according to the flowchart in FIG. 4, microcomputer 26 returns to the processing for causing the timer 20 to measure the period of the track accessing signal produced by the edge detection circuit 43, without performing the calculation and output of the output value to be supplied to the D/A converter 33 on the basis of the measured value of the timer 20 in the period of the pulse-like noise portion. The microcomputer 26 reads another normal period T1 in place of the period T1' to thereby calculate the output value to be supplied to the D/A converter 33. In this manner, it is possible to prevent the sudden deceleration of the light beam.

Further, the predetermined velocity value N2 is set so that the following relation is satisfied:

$$N2 > N3$$

where N3 represents a command velocity corresponding to the predetermined count value N1 shown in FIG. 3. The reason why such a relation must be satisfied will be described hereunder. The light beam moves toward the target track substantially at a command velocity $V_{ref}$ in the track search operation as described above. That is, the light beam moves substantially at a velocity of not higher than the predetermined velocity N3 in the case where the count value of the counter 25 is smaller than N1, that is, in the positional range between the target track and the N1 track. The light beam is actually moving substantially at the command velocity $V_{ref}$ larger than the predetermined velocity value N2, and this is the very reason why the detected velocity $V_{real}$ is not compared with the predetermined velocity value N2 when the count value of the counter 25 is not smaller than the predetermined count value N1. Further, to prevent maloperation due to error in follow-up operation of the velocity of movement of the light beam relative to the command velocity $V_{ref}$ from occurring is the very reason why the predetermined velocity value N2 is made higher than the command velocity N3.

On the other hand, the coincidence detection circuit 29 is arranged to supply a coincidence signal of "L" to the microcomputer 26 when the count value of the counter 25 is zero (all zero), or "H" when it is not zero. As described above, the count value of the counter 25 in the track search operation represents the current position of the light beam on the basis of the target track. Accordingly, when the count value of the counter 25 becomes zero, the light beam has reached the target track. When the termination signal produced by the coincidence detection circuit 29 becomes "L", the microcomputer 26 immediately turns the switch 34 off and the switch 15 on so as to operate tracking control, terminating the track search operation.

In the configuration as described above, even in the case where dropout of disk or device noise is mixed into the tracking error signal produced by the differential amplifier 12 so that the pulse-like noise is generated in the output signal of the binary-digitizing circuit 40 to thereby erroneously detect the velocity of the light beam so as to have a velocity value extremaly higher than the actual velocity, the velocity detection process is carried out again so that abnormal sudden deceleration of the light beam can be prevented to thereby make it possible to stably carry out the track search operation.

Although the description has been made in the above embodiment about the case where the velocity detection is repeated again when the count value of the counter 25 is smaller than the predetermined count value N1 and the detected velocity $V_{real}$ is larger than the predetermined velocity value N2, the effects described above can be further increased if a plurality of conditions for making the velocity detection repeated again are set, for example, in a manner so that the velocity detection is repeated again even in the case where the count value of the counter 25 is smaller than the predetermined measured value M1 and the detected velocity $V_{real}$ is larger than the predetermined velocity value M2 under the condition that the following relation is satisfied:

$$M1 > N1.$$

At this time, the predetermined velocity value M2 is set so as to satisfy the following relation:

$$M2 > M3$$

where M3 represents the command velocity corresponding to the predetermined count value M1 shown in FIG. 3.

Figure 6:
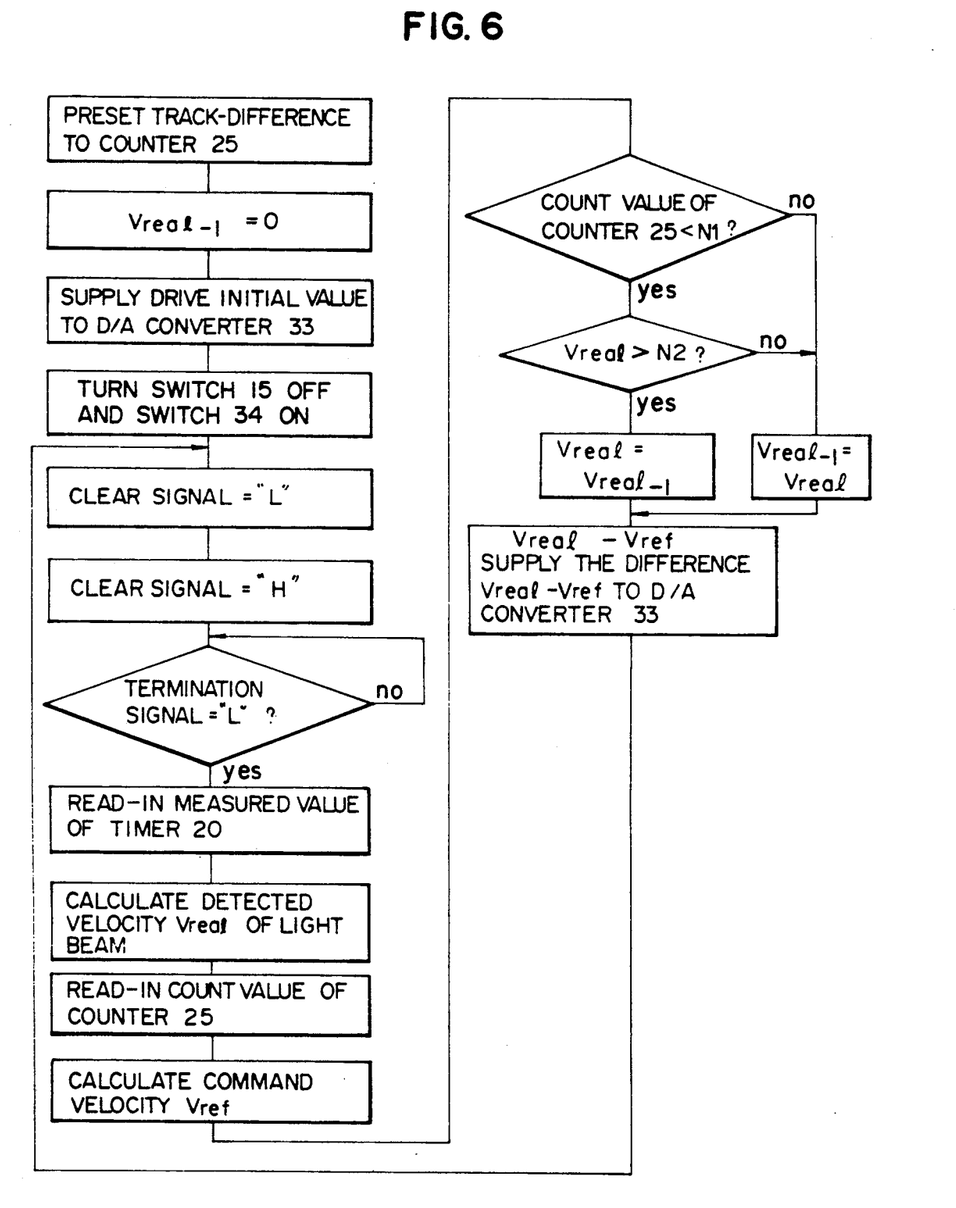
FIG. 6 is a flowchart of processing executed by the microcomputer 26 in the second embodiment.

Referring to the drawings, a second embodiment of the track search apparatus will be described hereunder. The block diagram of the second embodiment is the same as that of the first embodiment and FIG. 1 is referred to again for the explanation of this second embodiment. Similarly to the first embodiment, also the second embodiment is cf type of a software servo system in which a part of a search control system is programmed so as to be processed by a microcomputer 26. FIG. 6 is a flowchart showing some steps particularly relating to this second embodiment of the processing to be performed by the microcomputer 26. Referring to the flowchart of FIG. 6, the second embodiment will be described hereunder.

Before the track search operation is performed, the switch 15 has been turned on and the switch 34 has been turned off by the microcomputer 26, and the tracking control is being operated so as to make the light beam follow a predetermined track. Prior to the track search operation, the microcomputer 26 clears a memory incorporated in the microcomputer 26. That is, the microcomputer 26 clears the contents of the memory in which a detected velocity $V_{real-1}$ of the light beam sampled at the last time has been stored. Further, the microcomputer 26 presets the track difference between the track-search start track and the target track to a counter 25 and sets a predetermined drive initial value to a D/A converter 33. Further, each of the coincidence signal produced by a coincidence detection circuit 29, the clear signal produced by the microcomputer 26, and the termination signal produced by a timer 20 is set to "H". The switch 15 is turned off and the switch 34 is turned on in accordance with the command from the microcomputer 26, so that the tracking control is made inoperative, the light beam is started to move toward the target track, and the track search operation is started. Next, the microcomputer 26 sets the clear signal to "L" momentarily and sets the clear signal to "H" again. When the timer 20 detects a trailing edge of the clear signal produced by the microcomputer 26, the timer 20 clears its measured value and begins to measure the period of the track accessing signal produced by an edge detection circuit 43. Upon completion of the measurement of one period of the track accessing signal, the timer 20 sets the termination signal to "L" and holds the measured value until the clear signal produced by the microcomputer 26 becomes "L" again, and the period measurement is not performed by the timer 20. The microcomputer 26 waits till the termination signal produced by the timer 20 becomes "L", and when the termination signal becomes "L", the microcomputer 26 immediately reads the measured value held in the timer 20 so as to calculate a detected or actual velocity $V_{real}$ of the light beam on the basis of the measured value in accordance with the following equation.

$$V_{real} = P/DT$$

where P represents the distance between adjacent two tracks and DT represents the measured value of the timer 20.

Succeedingly, the microcomputer 26 reads the count value of the counter 25 and calculates a command velocity $V_{ref}$ on the basis of the count value. The relation between the count value of the counter 25 and the command velocity $V_{ref}$ is established in a manner as shown in FIG. 3, similarly to the case of the first embodiment. Next, the microcomputer 26 compares the count value of the counter 25 with a predetermined count value N1. In the case where the count value of the counter 25 is larger than the predetermined count value N1, the microcomputer 26 replaces the detected velocity $V_{real-1}$ of the light beam sampled at the last time with a detected velocity $V_{real}$ sampled presently, and thereafter calculates the difference between the detected velocity $V_{real}$ of the light beam and the command velocity $V_{ref}$ and supplies the calculated value to the D/A converter 33. Thereafter, the microcomputer 26 sets the clear signal to "L" momentarily, then sets the clear signal to "H" again, and then returns to the processing for causing the timer 20 to measure the period of the track accessing signal produced by the edge detection circuit 43. The output of the D/A converter 33 drives the voice coil motor 4 through the switch 34, the adder 16, and the driving circuit 17. The polarity of the signal produced by the D/A converter 33 is set so that the light beam is accelerated by the voice coil motor 4 toward the target track when the command velocity $V_{ref}$ is higher than the detected velocity $V_{real}$, while it is set so that the light beam is decelerated when the command velocity $V_{ref}$ is lower than the detected velocity $V_{real}$, similarly to the case of the first embodiment. Accordingly, the light beam moves toward the target track at a velocity substantially equal to the command velocity $V_{ref}$ in the track search operation. On the other hand, when the count value of the counter 25 is smaller than the predetermined count value N1, the microcomputer 26 compares the detected velocity $V_{real}$ of the light beam with a predetermined velocity value N2. When the detected velocity $V_{real}$ of the light beam is higher than the predetermined velocity value N2, the microcomputer 26 replaces the detected velocity $V_{real}$ sampled presently with the detected velocity $V_{real-1}$ sampled at the last time. Then, the microcomputer 26 calculates the difference between the detected velocity $V_{real}$ of the light beam and the command velocity $V_{ref}$ and supplies the calculated value to the D/A converter 33. Thereafter, the microcomputer 26 sets the clear signal to "L" momentarily, then sets the clear signal to "H" again, and then returns to the processing for causing the timer 20 to measure the period of the track accessing signal produced by the edge detection circuit 43. Accordingly, at this time, the difference between the detected velocity $V_{real-1}$ of the light beam sampled at the last time and the command velocity $V_{ref}$ based on the count value of the counter 25 read presently is supplied to the voice coil motor 4 through the D/A converter 33. Further, when the detected velocity $V_{real}$ of the light beam is not higher than the predetermined velocity value N2, the microcomputer 26 performs the same processing executed in the case where the count value of the counter 25 is larger than the predetermined count value N1.

Figure 7A:
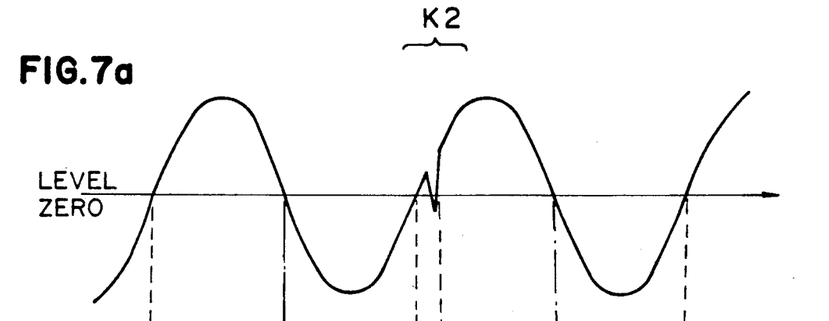
FIGS. 7(a)-(d) are used to explain the tracking error signal and the track accessing signal in the case of mixture of noise in the second embodiment.
Figure 7B:
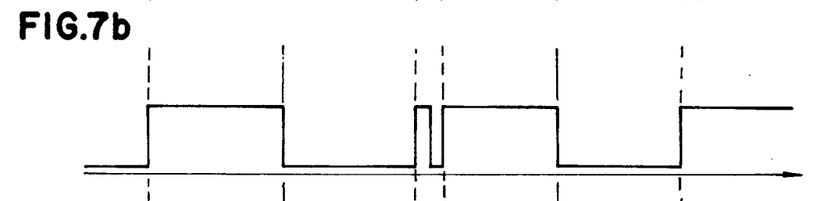
Figure 7C:
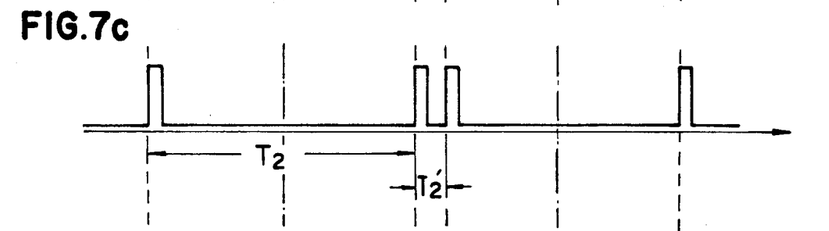
Figure 7D:
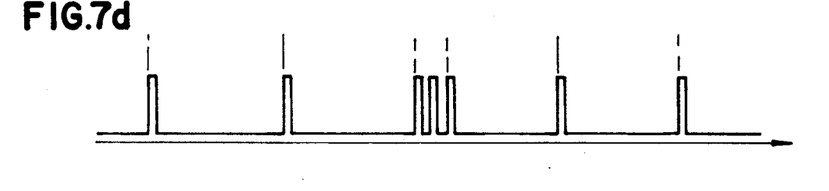

Referring to the flowchart of FIG. 6, the operation in the case of mixture of dropout of disk or device noise will be described. FIGS. 7(a)-(d) show signals when noise due to dropout or device noise is mixed in the tracking error signal. That is, FIGS. 7(a) 7(c) diagrams show the tracking error signal produced by the differential amplifier 12, the binary-digitized signal produced by the binary-digitizing circuit 40, and the track accessing signal produced by the edge detection circuit 43 respectively. FIG. 7(d); shows a signal obtained by detecting leading and trailing edges of the signal shown in FIG. 7(b). The variations of the tracking error signal in a time domain K2 in FIG. 7(a); are caused by the mixture of disk or device noise and do not correspond to the relation between the light beam and the track. Pulse-like noise is caused in the binary-digitized signal as shown in FIG. 7(b); because of the noise in the time domain K2. The period T2' of the pulselike noise portion in the time domain K2 in FIG. 7(b). (b) of FIG. 7 is extremely short in comparison with the period T2 sampled at the last time. Assume now that the count value of the counter 25 satisfies the relation of the following expression:

DC<N1 where DC represents the count value of the counter 25, and N1 represents the predetermined count value. Further assume that the following relation is satisfied:

$$V2' > N2$$

where V2' represents the light-beam velocity corresponding to the period T2', and N2 represents the predetermined velocity value. At this time, according to the flowchart in FIG. 6, microcomputer 26 does not perform the calculation and output of the output value to be supplied to the D/A converter 33 on the basis of the measured value of the timer 20 in the period of the pulse-like noise portion, while the microcomputer 26 replaces the detected velocity $V_2'$ of the light beam with the detected velocity $V_{real-1}$ of the light beam sampled at the last time and then performs calculation and output of its output value to be supplied to the D/A converter 33. Since the distance between tracks adjacent to each other is generally extremely short to be not longer than 1.6 microns (μm), the velocity of the light beam before and after the pulse-like noise generating portion is substantially equal to the velocity at the pulse-like noise generating portion even in the case where the light beam is being accelerated or decelerated. Accordingly, if the detected velocity at the pulse-like noise generating portion is replaced by the detected velocity $V_{real-1}$ sampled at the last time as described above, the light beam can be prevented from sudden deceleration.

Further, although description has been made in the above embodiment about the case where the variation of the tracking error signal due to dropout of disk or device noise appears in the form of only one pulse as shown in FIGS. 7(a)-(d), it is apparent that the flowchart shown in FIG. 6 is similarly effective even in the case where variation is generated in the form of a plurality of successive pulses. Assume that noise in the form of successive Q pulses (Q being a natural number not smaller than 2) is generated in the binary-digitized signal produced by the binary-digitizing circuit 40. At this time, the output value to be supplied to the D/A converter 33 is calculated and produced after the detected velocity of the light beam in the pulse-like noise portion is similarly replaced by the detected velocity $V_{real-1}$. That is, at this time, the detected velocity of the light beam sampled presently has been replaced by the detected velocity of the light beam sampled Q-times before.

Further, similarly to the case of the first embodiment, the predetermined velocity value N2 is set so that the following relation is satisfied:

$$N2 > N3$$

where N3 represents a command velocity corresponding to the predetermined count value N1 shown in FIG. 3. The reason why such a relation must be satisfied will be described hereunder. The light beam moves toward the target track substantially at a command velocity $V_{ref}$ in the track search operation as described above. That is, the light beam moves substantially at a velocity not higher than the predetermined velocity N3 in the case where the count value of the counter 25 is smaller than N1, that is, in the positional range between the target track and the N1 track. The light beam is actually moving substantially at the command velocity $V_{ref}$ larger than the predetermined velocity value N2, and this is the very reason why the detected velocity $V_{real}$ is not compared with the predetermined velocity value N2 when the count value of the counter 25 is not smaller than the predetermined count value N1. Further, the prevention of malfunction due to error in followup operation of the velocity of movement of the light beam relative to the command velocity $V_{ref}$ is the reason why the predetermined velocity value N2 is made higher than the command velocity N3.

Thereafter, when the light beam has reached the target track and the termination signal produced by the coincidence detection circuit 29 becomes "L", the microcomputer 26 immediately turns the switch 34 off and the switch 15 on so as to operate tracking control, terminating the track search operation.

In the configuration as described above, even in the case where dropout of disk or device noise is mixed into the tracking error signal produced by the differential amplifier 12 so that the pulse-like noise is generated in the output signal of the binary-digitizing circuit 40 to thereby erroneously detect the velocity of the light beam so as to have a velocity value extremely higher than the actual velocity, the detected velocity in the noise portion is replaced by the detected velocity sampled at least once before so that abnormal sudden deceleration of the light beam can be prevented to thereby make it possible to stably carry out the track search operation.

Although the description has been made in the above embodiment about the case where the detected velocity sampled presently is replaced by the detected velocity sampled at least once before when the count value of the counter 25 is smaller than the predetermined count value N1 and the detected velocity $V_{real}$ is larger than the predetermined velocity value N2, the effects described above can be further enhanced if a plurality of conditions for making the replacement of the detected velocity of the light beam sampled presently with the detected velocity at least once before are set, for example, in a manner so that the detected velocity sampled presently is replaced by the detected velocity sampled at least once before even in the case where the count value of the counter 25 is smaller than the predetermined measured value M1 and the detected velocity $V_{real}$ is larger than the predetermined velocity value M2 under the condition that the following relation is satisfied:

$$M1 > N1.$$

At this time, the predetermined velocity value M2 is set so as to satisfy the following relation:

$$M2 > M3$$

where M3 represents the command velocity corresponding to the predetermined count value M1 shown in FIG. 3.

Figure 2D:
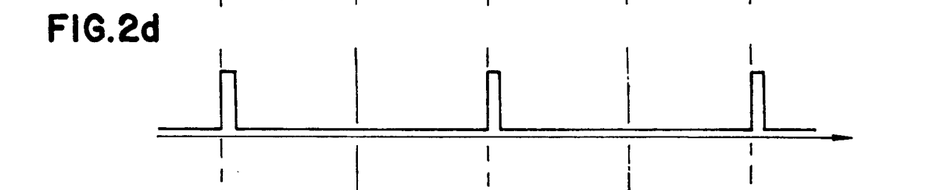
Figure 2E:
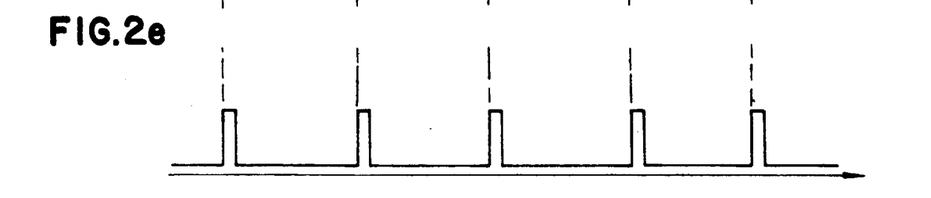
Figure 3:
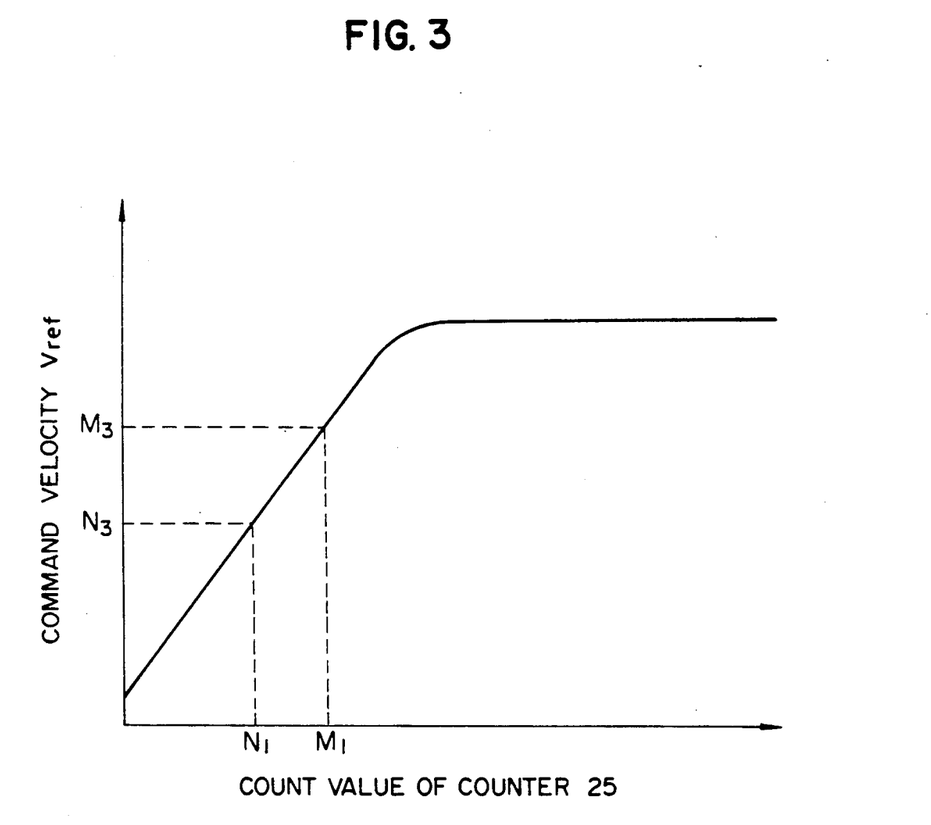
FIG. 3 is a graph for explaining the relation between the count value of the counter 25 and the command velocity $V_{ref}$.

Although the description has been made about the case where an edge detection circuit 43 detects the fact that the light beam crosses the center of each of tracks as shown in FIG. 2(d); in each of the first and second embodiments, it is apparent that the same effect can be obtained even in the case where the edge detection circuit 43 is arranged to detect the fact that the light beam crosses the center of each of tracks and the central point between tracks adjacent to each other as shown in FIG. 2(e). In this case, prior to the track search operation, a value twice as large as the track difference between the track-search start track and the target track is preset to the counter 25 by the microcomputer 26. At this time, the microcomputer 26 calculates the detected velocity $V_{real}$ of the light beam on the basis of the measured value of the timer 20 in accordance with the following expression:

$$V_{real} = P/(2 \cdot DT)$$

where P represents the distance between tracks adjacent to each other, and DT represents the measured value of the timer 20.

We claim:

1. A velocity detection method used for a track-seek operation including guiding a conversion means onto a target track of a recording medium including a plurality of tracks which are spaced apart by a given distance, said conversion means for recording and reproducing signals on and from the plurality of tracks of the recording medium, said method comprising the steps of:
   (a) setting a position of said target track;
   (b) moving said conversion means toward said target track;
   (c) measuring a time period for which said conversion means crosses adjacent ones of said tracks;
   (d) calculating a relative velocity between said conversion means and said tracks based on a product of a reciprocal of said time period and said distance between said tracks;
   (e) determining a relative position of said conversion means with respect to said target track;
   (f) establishing a plurality of predetermined velocity limits with respect to relative positions of said conversion means relative to the position of said target track;
   (g) comparing said relative velocity with one of said velocity limits;
   (h) when said relative velocity is determined in step (g) to be larger than said one of said velocity limits, reiterating steps (c)-(g); and
   (i) when said relative velocity is determined in step (g) to be less than or equal to said one of said velocity limits, providing said relative velocity as a detected velocity.

2. A velocity detection method used for a track-seek operation including guiding a conversion means onto a target track of a recording medium including a plurality of tracks which are spaced apart by a given distance, said conversion means for recording and reproducing signals on and from the plurality of tracks of the recording medium, said method comprising the steps of:
   (a) setting a position of said target track;
   (b) moving said conversion means toward said target track;
   (c) measuring a time period for which said conversion means crosses adjacent ones of said tracks;
   (d) calculating a relative velocity between said conversion means and said tracks based on a product of a reciprocal of said time period and said distance between said tracks;
   (e) determining a relative position of said conversion means with respect to said target track;
   (f) determining whether said relative position is apart from said target track more than a predetermined distance;
   (g) providing said relative velocity as a detected velocity, only when said relative position is determined in step (f) to be apart from said target track more than said predetermined distance;
   (h) establishing a plurality of predetermined velocity limits with respect to relative positions of said conversion means relative to the position of said target track;
   (i) comparing said relative velocity with said one of said velocity limits when said relative position is determined in step (f) to be apart from said target track not more than said predetermined distance;
   (j) when said relative velocity is determined in step (i) to be larger than said one of said velocity limits, reiterating steps (c)-(f); and
   (k) when said relative velocity determined in step (i) to be less than or equal to said one of said velocity limits, providing said relative velocity as a measured value.

3. A velocity detection method used for a track-seek operation including guiding a conversion means onto a target track of a recording medium including a plurality of tracks which are spaced apart by a given distance, said conversion means for recording and reproducing signals on and from the plurality of tracks of the recording medium, said method comprising the steps of:
   (a) storing a value in a memory means as a velocity value;
   (b) setting a position of said target track;
   (c) moving said conversion means toward said target track;
   (d) measuring a time period for which said conversion means crosses adjacent ones of said tracks;
   (e) calculating a relative velocity between said conversion means and said tracks based on a product of a reciprocal of said time period and said distance between said tracks;
   (f) determining a relative position of said conversion means with respect to said target track;
   (g) establishing a plurality of predetermined velocity limits with respect to relative positions of said conversion means relative to the position of said target track;
   (h) comparing said relative velocity with one of said velocity limits;
   (i) reading out said velocity value from said memory means and when said relative velocity is determined in step (h) to be larger than said one of said velocity limits, providing said velocity value as a detected velocity; and
   (j) when said relative velocity is determined in step (h) to be less than or equal to said one of said velocity limits, providing said relative velocity as a detected velocity and storing said relative velocity in said memory means as a velocity value.

4. A velocity detection method used for a track-seek operation including guiding a conversion means onto a target track of a recording medium including a plurality of tracks which are spaced apart by a given distance, said conversion means for recording and reproducing signals on and from the plurality of tracks of the recording medium, said method comprising the steps of:
   (a) storing a value in a memory means as a velocity value;
   (b) setting a position of said target track;
   (c) moving said conversion means toward said target track;
   (d) measuring a time period for which said conversion means crosses adjacent ones of said tracks;

(e) calculating a relative velocity between said conversion means and said tracks based on a product of a reciprocal of said time period and said distance between said tracks;

(f) determining a relative position of said conversion means with respect to said target track;

(g) determining whether said relative position is apart from said target track more than a predetermined distance;

(h) when said relative position is determined in step (g) to be apart from said target track more than said predetermined distance, storing said relative velocity in said memory means as a velocity value;

(i) establishing a plurality of predetermined velocity limits with respect to relative positions of said conversion means relative to the position of said target track;

(j) comparing said relative velocity with one of said velocity limits when said relative position is determined in step (g) to be apart from said target track not more than said predetermined distance;

(k) reading out said velocity value from said memory means and when said relative velocity is determined in step (j) to be larger than said one of said velocity limits, providing said velocity value as a detected velocity; and (l) when said relative velocity is determined in step (j) to be less than or equal to said one of said velocity limits, providing said relative velocity as a detected velocity and storing said relative velocity in said memory means as a velocity value.

5. A track seeking apparatus for guiding a conversion means onto a target track of a recording medium including a plurality of tracks, said conversion means for recording and reproducing signals on and from said plurality of tracks of said recording medium, said apparatus comprising:

(a) a transferring means for moving said conversion means in a direction substantially parallel to a surface of said recording medium and substantially perpendicular to a longitudinal orientation of said tracks;

(b) a velocity detecting means for detecting a time period for which said conversion means crosses adjacent ones of said tracks and for measuring a relative velocity of said conversion means with respect to said tracks based on said time period to provide a relative velocity signal;

(c) a position detecting means for determining a position of said target track and determining a relative position of said conversion means with respect to said target track and for providing a position signal indicating said relative position;

(d) a velocity limit providing means storing a plurality of predetermined velocity limit values with respect to relative positions of said conversion means relative to the position of said target track and for providing said velocity limit values;

(e) a comparing means, receiving said relative velocity signal from said velocity detecting means and one of said velocity limit values from said velocity limit providing means, for providing a comparison signal representing a comparison therebetween; and (f) a driving means, receiving said comparison signal and said relative velocity signal, for driving said transferring means at a velocity in accordance with said relative velocity when said comparison signal indicates that said relative velocity is less than said one of said velocity limit values, and providing an output causing said velocity means to redetect said time period when said comparison signal indicates that said relative velocity is not less than said one of said velocity limit values.

6. A track seeking apparatus for guiding a conversion means onto a target track of a recording medium including a plurality of tracks, said conversion means for recording and reproducing signals on and from said plurality of tracks of said recording medium, said apparatus comprising:

(a) a transferring means for moving said conversion means in a direction substantially parallel to a surface of said recording medium and substantially perpendicular to a longitudinal orientation of said tracks;

(b) a velocity detecting means for detecting a time period for which said conversion means crosses adjacent ones of said tracks and for measuring a relative velocity of said conversion means with respect to said tracks based on said time period to provide a relative velocity signal;

(c) a position detecting means for determining a position of said target track and determining a relative position of said conversion means with respect to said target track and for providing a position signal indicating said relative position;

(d) a position comparing means, having a reference distance value, for receiving said position signal, determining whether said relative position is apart from said target track more than said reference distance and providing a position comparison signal;

(e) a velocity limit providing means storing a plurality of predetermined velocity limit values with respect to relative positions of said conversion means relative to the position of said target track and for providing said velocity limit values;

(f) a velocity comparing means, receiving said relative velocity signal and said velocity limit values, for performing a comparison between said relative velocity signal and one of said velocity limit values to provide a velocity comparison signal indicating a result of said comparison; and (g) a driving means, receiving said position comparison signal, said velocity comparison signal and said relative velocity signal, for driving said transferring means at a velocity in accordance with said relative velocity when (i) said position comparison signal indicates that said relative position is apart from said target track more than said reference distance or (ii) said position comparison signal indicates that said relative position is not apart from said target track more than said reference distance and said velocity comparison signal indicates that said relative velocity is less than said one of said velocity limit values and for providing an output causing said velocity detecting means to redetect said time period when said position comparison signal indicates that said relative position is not apart from said target track more than said reference distance and said velocity comparison signal indicates that said relative velocity is not less than said one of said velocity limit values.

7. A track seeking apparatus for guiding a conversion means onto a target track of a recording medium including a plurality of tracks, said conversion means for recording and reproducing signals on and from said plurality of tracks of said recording medium, said apparatus comprising:

(a) a transferring means for moving said conversion means in a direction substantially parallel to a surface of said recording medium and substantially perpendicular to a longitudinal orientation of said tracks;

(b) a velocity detecting means for detecting a time period for which said conversion means crosses adjacent ones of said tracks and for measuring a relative velocity of said conversion means with respect to said tracks based on said time period to provide a relative velocity signal;

(c) a position detecting means for determining a position of said target track and determining a relative position of said conversion means with respect to said target track and for providing a position signal indicating said relative position;

(d) a velocity limit providing means storing a plurality of velocity limit values which are predetermined with respect to relative positions of said conversion means relative to the position of said target track and for providing said velocity limit values;

(e) a comparing means, receiving said relative velocity signal from said velocity detecting means and one of said velocity limit values from said velocity limit providing means, for providing a comparison signal representing a comparison therebetween;

(f) a memory means for providing a held value and replacing said held value with said relative velocity value when said comparison signal indicates that said relative velocity is less than said one of said velocity limit values; and (g) a driving means, receiving said comparison signal, said relative velocity value and said held value, for driving said transferring means at a velocity in accordance with said relative velocity when said comparison signal indicates that said relative velocity is less than said one of said velocity limit values and at a velocity in accordance said held value when said comparison signal indicates that said relative velocity is not less than said one of said velocity limit values.

8. A track seeking apparatus for guiding a conversion means onto a target track of a recording medium including a plurality of tracks, said conversion means for recording and reproducing signals on and from said plurality of tracks of said recording medium, said apparatus comprising:

(a) a transferring means for moving said conversion means in a direction substantially parallel to a surface of said recording medium and substantially perpendicular to a longitudinal orientation of said tracks;

(b) a velocity detecting means for detecting a time period for which said conversion means crosses adjacent ones of said tracks and for measuring a relative velocity of said conversion means with respect to said tracks based on said time period to provide a relative velocity signal;

(c) a position detecting means for determining a position of said target track and determining a relative position of said conversion means with respect to said target track and for providing a position signal indicating said relative position;

(d) a position comparing means, having a reference distance value, for receiving said position signal, determining whether said relative position is apart from said target track more than said reference distance and providing a position comparison signal;

(e) a velocity limit providing means storing a plurality of predetermined velocity limit values with respect to relative positions of said conversion means relative to the position of said target track and for providing said velocity limit values;

(f) a velocity comparing means, receiving said relative velocity signal and one of said velocity limit values, for performing a comparison between said relative velocity signal and said one of said velocity limit values to provide a velocity comparison signal indicating a result of said comparison;

(g) a memory means for providing a held value and replacing said held value with said relative velocity value when (i) said position comparison signal indicates that said relative position is apart from said target track more than said reference distance or (ii) said position signal indicates that said relative position is not apart from said target track more than said reference distance and said velocity comparison signal indicates that said relative velocity is less than said one of said velocity limit values; and (h) a driving means, receiving said position comparison signal, said velocity comparison signal, said relative velocity value and said held value, for driving said transferring means at a velocity in accordance with said relative velocity when (i) said position comparison signal indicates that said relative position is apart from said target track more than said reference distance or (ii) said position comparison signal indicates that said relative position is not apart from said target track more than said reference distance and said velocity comparison signal indicates that said reference velocity is less than said one of said velocity limit values, and at a velocity in accordance with said held value when said position comparison signal indicates that said relative position is not apart from said target track more than said reference distance and said velocity comparison signal indicates that said relative velocity is not less than said one of said velocity limit values.

* * * * *